(12) United States Patent
Vuillermet

(10) Patent No.: US 12,722,463 B2
(45) Date of Patent: Sep. 1, 2026

(54) GLAZING COMPRISING SEVERAL PROFILED SEALS, PROFILED SEAL AND METHOD OF MANUFACTURING SUCH A GLAZING

(71) Applicant: SAINT-GOBAIN SEKURIT FRANCE, Thourotte (FR)

(72) Inventor: Gaël Vuillermet, Dabrowa Gornicza (PL)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 0 days.

(21) Appl. No.: 19/116,205

(22) PCT Filed: Sep. 27, 2023

(86) PCT No.: PCT/EP2023/076636
§ 371 (c)(1),
(2) Date: Mar. 27, 2025

(87) PCT Pub. No.: WO2024/068690
PCT Pub. Date: Apr. 4, 2024

(65) Prior Publication Data

US 2026/0109212 A1 Apr. 23, 2026

(30) Foreign Application Priority Data

Sep. 28, 2022 (FR) ....................................... 2209821

(51) Int. Cl.
*B60J 10/70* (2016.01)
*B60J 10/21* (2016.01)
*B60J 10/22* (2016.01)

(52) U.S. Cl.
CPC ............... *B60J 10/70* (2016.02); *B60J 10/21* (2016.02); *B60J 10/22* (2016.02)

(58) Field of Classification Search
CPC ............. B60J 10/21; B60J 10/22; B60J 10/70
See application file for complete search history.

(56) References Cited

U.S. PATENT DOCUMENTS 4,757,660 A * 7/1988 Miyakawa ............... B60J 10/70 52/204.597
5,078,444 A * 1/1992 Shirahata ................ B29C 48/12 52/204.597
5,167,893 A * 12/1992 Yada ........................ B60J 10/22 425/465

(Continued)

FOREIGN PATENT DOCUMENTS

DE 10 2013 003358 A1 8/2014
DE 10 2013 012628 A1 1/2015

(Continued)

OTHER PUBLICATIONS

International Search Report as issued in International Patent Application No. PCT/EP2023/076636, dated Dec. 12, 2023.

*Primary Examiner* — Nicholas L Foster
(74) *Attorney, Agent, or Firm* — CUSHMAN PARTNERS, LLC

(57) ABSTRACT

A glazing includes a glazed element including a longitudinal profiled seal with a flange and longitudinal groove and a lateral profiled seal having an end extending into the environment of the corner with the base facing the flange of the longitudinal profiled seal.

17 Claims, 3 Drawing Sheets

(56) References Cited

U.S. PATENT DOCUMENTS

| | | | | | |
|---|---|---|---|---|---|
| 5,174,623 | A * | 12/1992 | Yada | B60J 10/21 | |
| | | | | 296/93 | |
| 5,803,527 | A * | 9/1998 | Fujiya | B60J 10/21 | |
| | | | | 296/93 | |
| 5,837,297 | A * | 11/1998 | Yada | B29C 48/302 | |
| | | | | 425/465 | |
| 10,399,423 | B2 * | 9/2019 | Trombetta | B60J 1/004 | |
| 2025/0368011 | A1 * | 12/2025 | Silvestrini | B24B 9/10 | |

FOREIGN PATENT DOCUMENTS

| | | | |
|---|---|---|---|
| DE | 10 2016 113862 | A1 | 2/2017 |
| JP | 2009-190644 | A | 8/2009 |
| WO | WO 01/45974 | A1 | 6/2001 |
| WO | WO 01/85481 | A1 | 11/2001 |
| WO | WO 02/30696 | A1 | 4/2002 |

* cited by examiner

[Fig.1]
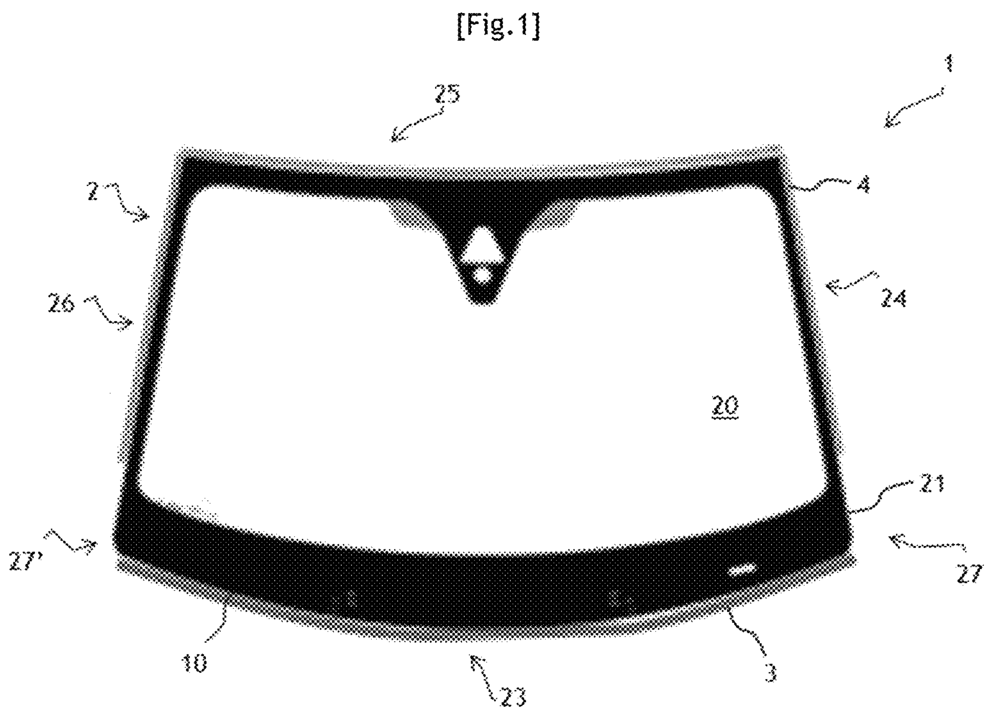

[Fig.2]
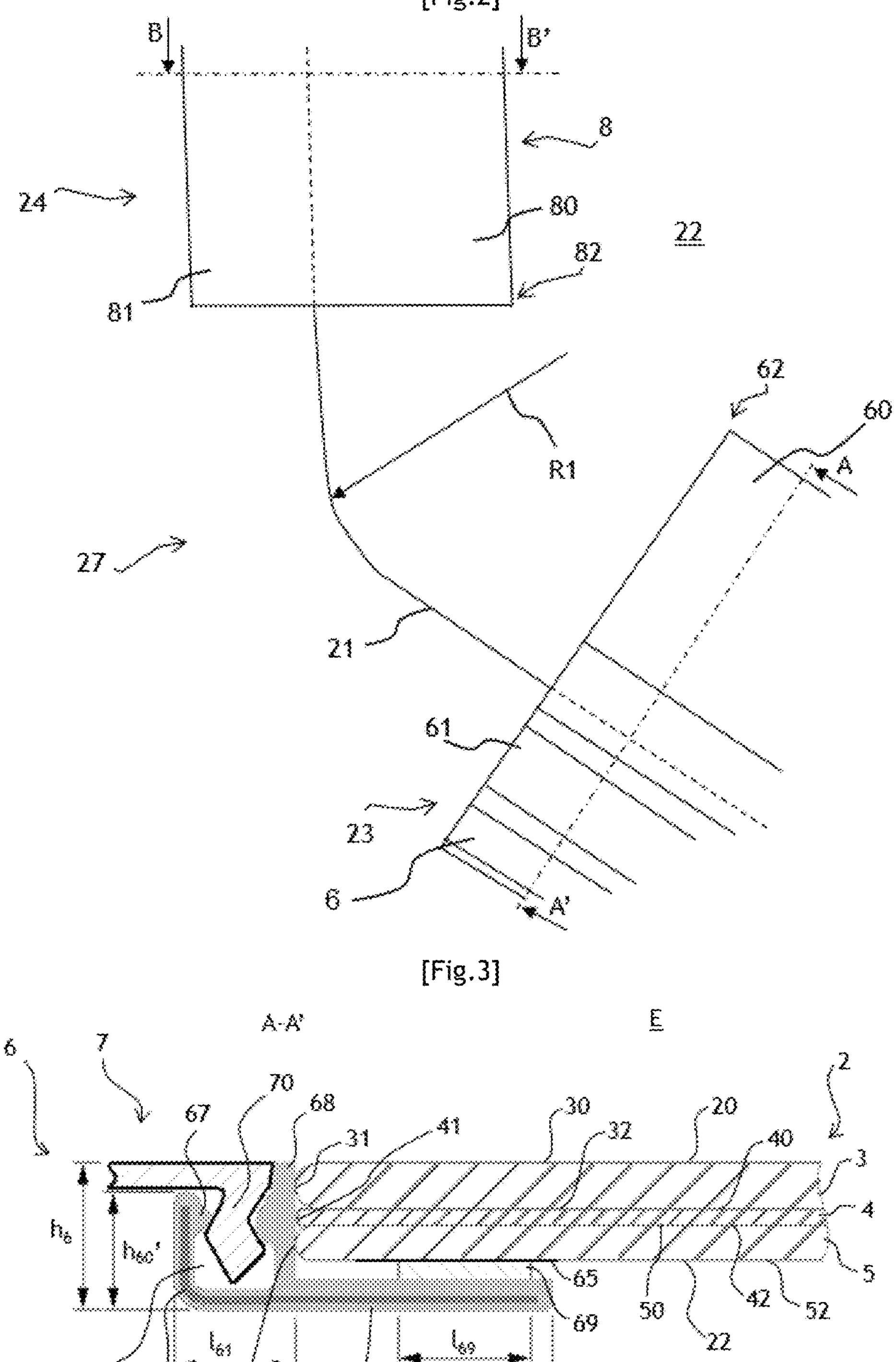
[Fig.3]

[Fig.4]
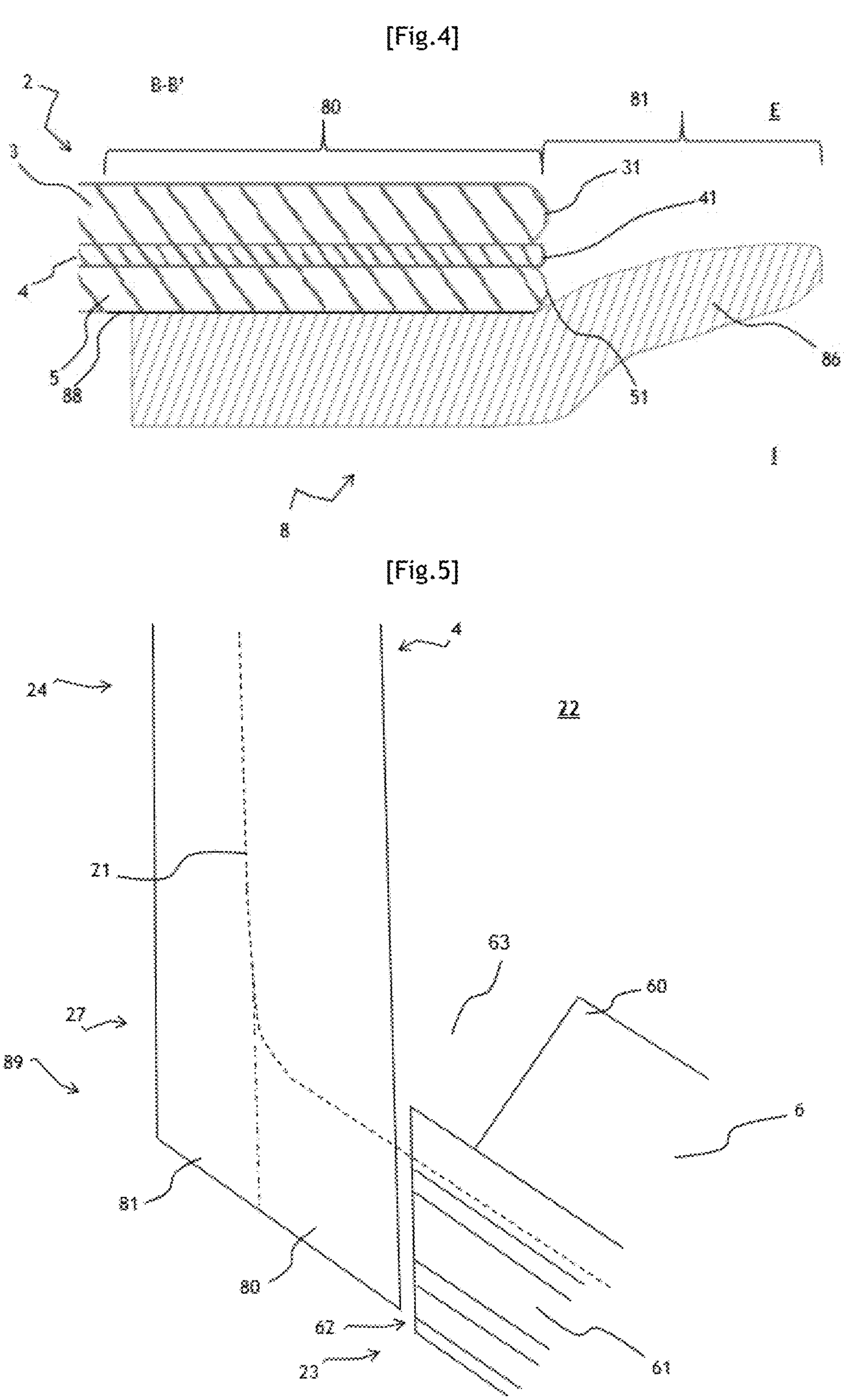
[Fig.5]

GLAZING COMPRISING SEVERAL PROFILED SEALS, PROFILED SEAL AND METHOD OF MANUFACTURING SUCH A GLAZING

CROSS-REFERENCE TO RELATED APPLICATIONS

This application is the U.S. National Stage of PCT/EP2023/076636, filed Sep. 27, 2023, which in turn claims priority to French patent application number 2209821 filed Sep. 28, 2022. The content of these applications are incorporated herein by reference in their entirety.

The invention relates to the field of glazing units, especially for vehicles, and in particular for motor vehicles. The invention relates more precisely to a glazing comprising a glazed element having an external face, an internal face and an edge face located between these two faces, a longitudinal edge, a lateral edge and a corner located between said longitudinal edge and said lateral edge.

More specifically, the invention relates to a glazing comprising a glazed element having an external face, an internal face and an edge face located between these two faces, a low longitudinal edge, a high longitudinal edge, two lateral edges, two low corners each located between said low longitudinal edge and one of the two lateral edges and two high corners each located between said high longitudinal edge and one of the two lateral edges. The notions of “high” and “low” here refer to the essentially vertical positioning of the glazing in the vehicle’s environment.

The invention also relates to a particular profiled seal for such a glazing and to a method for manufacturing such a glazing.

Known from the prior art, in particular from international patent applications No. WO 2001/45974 and WO 2001/85481, is a glazing comprising a longitudinal profiled seal along a low longitudinal edge and having a longitudinal flange and a longitudinal groove for snap-fitting an outer cover part to said low longitudinal profiled seal, the flange being attached to the internal face of the glazed element along the longitudinal edge of the glazed element and the groove extending from the flange further than the edge face of the glazed element, in the direction of the interior space or the exterior space.

Although these documents do not mention it, it is possible to provide that part of the remaining perimeter of the glazed element, along the other edges, is provided with another profiled seal and in particular along the lateral edges, such as a profiled lip seal like the one disclosed in international patent application No. WO 2002/30696. Thus, in a corner located between a longitudinal edge and a lateral edge (and preferably in the two corners located at the ends of the grooved low longitudinal profiled seal), the glazing comprises several different profiled seals.

These profiled seals are different first and foremost because their profiled section is different, due to their different function. A side profile seal has no groove, since there is no outer cover part to snap-fit along a lateral edge.

When two different profile seals are proximate to one another in the vicinity of a glazing corner, it is generally chosen that one profile seal (usually the lateral profile seal) ends far away from the other so that their different shapes and/or methods of attachment to the glazing element do not interfere with one another.

However, due to the functions of each profiled seal, it may be desirable in this corner environment for the two different profiled seals to be as close as possible, or even to be in contact with one another.

The present invention is based on the discovery that, surprisingly, this can be achieved by providing that, for the bossed lateral profiled seal, the base extends into the corner environment to be proximate to or in contact with the flange of the longitudinal profiled seal, or that the base extends even further into the corner environment to be proximate to or in contact with the groove of the longitudinal profiled seal.

This configuration is particularly advantageous when the two profiled seals are not attached to the glazing using the same method; in particular, this configuration is highly advantageous when the longitudinal profiled seal is prefabricated and then attached to the glazed element with an adhesive band, and the lateral profiled seal is attached to the glazed element by in-situ extrusion onto the glazed element.

This configuration is particularly advantageous when the two profiled seals are attached to the glazing with a primer strip, and the two primer strips have different compositions; two different primer compositions imply that, by nature, these compositions are not compatible with one another, and if both are present, neither can fulfill its primer role.

This configuration is also particularly advantageous for managing the flow of water along the lateral profile: water sliding along the lateral profile is guided toward the lowest point and does not stagnate: the water does not remain and this avoids the risk of water degrading one (or both) primer(s); furthermore, there is no risk of dirt accumulating.

The invention thus relates, in its broadest sense, to a glazing according to claim 1.

This glazing comprises a glazed element having an external face, an internal face and an edge face located between these two faces, a longitudinal edge, a lateral edge and a corner located between said longitudinal edge and said lateral edge, said glazing comprising several different profiled seals:

- a longitudinal profiled seal having a longitudinal flange and a longitudinal groove for snap-fitting an outer cover part to said longitudinal profiled seal, said flange being attached to said internal face along said longitudinal edge and said groove extending from said flange further than said edge face,
- a lateral profiled seal having a base and a bead, said base being attached to said internal face along said lateral edge and said bead extending from said base further than said edge face, the glazing being remarkable in that a lateral end of said lateral profiled seal extends into the environment of said corner with said base located opposite said flange of the longitudinal profiled seal, or even opposite said groove of said longitudinal profiled seal.

Said longitudinal profiled seal preferably being a low longitudinal profiled seal, preferably a low lateral end of said lateral profiled seal extends into the environment of said low corner with said base located opposite said flange of the longitudinal profiled seal, or even lower opposite said groove of said longitudinal profiled seal.

Advantageously, in the environment of said corner said longitudinal profiled seal is present by being attached all along said longitudinal flange to said glazed element; said base of the lateral profiled seal is also attached to said glazed element in the environment of said corner.

Advantageously, said lateral edge of the glazed element is oriented substantially perpendicular to said longitudinal edge of the glazed element.

Advantageously, said longitudinal profiled seal has two ends and said glazing thus has two corner environments; these two corner environments are preferably according to the present invention, without necessarily being identical. These two corners are preferably low corners.

Preferably, along said longitudinal profile said groove extends from said flange further than said edge face in the centrifugal direction; preferably, said groove extends from said flange further than said edge face in the downward direction.

Preferably, along said lateral profile said bead extends from said base further than said edge face in the centrifugal direction.

Preferably, said longitudinal profiled seal consists of said longitudinal flange and said longitudinal groove for snap-fitting an outer cover part. Preferably, said lateral profiled seal consists of said base and said bead.

Preferably, in the environment of said corner, said groove is in contact with said bead and/or said flange is in contact with said base.

The notion of "contact" within the meaning of the present invention is to be assessed on a vehicle scale; in practice, a gap of 1 to 2 or even 3 mm may be measurable. What is important is that, visually, said lateral profiled seal and said longitudinal profiled seal appear to be in contact with one another; such a gap may, in absolute terms, cause a slight noise nuisance, but in practice it is acceptable.

Preferably, said end of the lateral profiled seal has a pointed or obtuse bevel; in this case, it is easier to appear in contact than when the end of the lateral profiled seal is straight.

Preferably, a lateral strip of primer is located between said base and said internal face, said lateral strip of primer extending into the environment of said corner.

Preferably, a longitudinal strip of primer is located between said flange and said internal face, said longitudinal strip of primer not extending into the environment of said corner.

Thus, preferably, the two strips of primer do not overlap.

Preferably, said longitudinal strip of primer has a different composition from said lateral strip of primer.

Preferably, said groove has a pointed or obtuse bevel at least at one, and preferably two, ends of said longitudinal profiled seal, with preferably one, and preferably two, slots between said flange and said base.

The invention also relates to a longitudinal profiled seal for the glazing according to the invention, remarkable in that said groove has a pointed or obtuse bevel at least at one end, and preferably at both ends. This configuration then reduces the empty space (without profiled seal) between the longitudinal profiled seal and the lateral profiled seal in the corner environment. The two different profiled seals can then be close, or as close as possible, or even in contact with one another.

To facilitate positioning of the longitudinal profiled seal, said flange preferably has a straight edge at least at one end, and preferably at both ends.

The invention further relates to a method of manufacturing a glazing according to the invention having an external face, an internal face and an edge face located between these two faces, a longitudinal edge, a lateral edge and a corner located between said longitudinal edge and said lateral edge, said glazing comprising several different profiled seals:

- a longitudinal profiled seal having a longitudinal flange and a longitudinal groove for snap-fitting a cover part to said longitudinal profiled seal, said flange being attached to said internal face along said longitudinal edge and said groove extending from said base further than said edge face,
- a lateral profiled seal having a base and a lateral bead, said base being attached to said internal face along said lateral edge and said bead extending from said base further than said edge face.

Said method is remarkable in that:

- said longitudinal profiled seal is attached to said internal face, then
- said lateral profiled seal is attached to said internal face, and said end of the lateral profiled seal extends into the environment of said corner with said base facing said flange of the longitudinal profiled seal or even said groove of the longitudinal profiled seal.

The two different profiled seals can then be as close as possible, or even in contact with one another.

Preferably, before said longitudinal profiled seal is attached to said internal face, a longitudinal strip of primer is applied against said internal face, said longitudinal strip of primer not extending into the environment of said corner.

Preferably, before said lateral profiled seal is attached to said internal face, a lateral strip of primer is applied against said internal face, said lateral strip of primer extending into the environment of said corner.

Preferably, a step of adjusting said end is performed before said longitudinal profiled seal is attached to said internal face.

The method according to the invention has the advantage of being easier to implement than prior art methods for manufacturing glazings with several profiled seals.

By way of non-limiting examples, several embodiments of the present invention will be described below, with reference to the appended figures, in which:

FIG. 1 shows a front view of the exterior space of a glazing of the prior art;

FIG. 2 shows a schematic view of the lower left corner of the glazing in FIG. 1, seen from the interior space;

FIG. 3 shows a schematic partial cross-section of the glazing in FIG. 2, along a plane A-A';

FIG. 4 shows a schematic partial cross-section, in plane B-B', of the glazing in FIG. 2; and FIG. 5 shows a schematic view of a lower left corner, seen from the interior space, of a glazing according to one embodiment of the invention.

The present invention is described by way of example in the context of an application as glazed unit 1, fixed, for a vehicle. This glazed unit closes an opening by providing the separation between an exterior space E which is outside the vehicle, and an interior space I which is inside the vehicle. The ideas of "exterior" and "interior" are therefore considered relative respectively to the exterior space and the interior space.

The present invention is disclosed, by way of non-limiting example, by being applied to a windshield glazing. In reference to FIG. 1, the glazing is viewed from the outside, oriented vertically as in a vehicle. In FIG. 5, the glazing is shown schematically, in a view equivalent to a view from the interior space, with the glazing not yet installed in a body opening (it is therefore not visible).

The glazing unit 1 comprises a glazed assembly 2. This glazed element may be monolithic, that is, made up of a single sheet of material, or may be composite, that is, made up of several sheets of material between which at least one interlayer of adhesive material is inserted in the case of laminated glazing units. The sheet(s) of material may be made of mineral material, in particular glass, having for example undergone annealing or tempering, or of organic material, particularly of plastic material such as polyvinyl butyral. The interlayer preferably contains at least one thermoplastic plastic material, preferably polyvinyl butyral (PVB), ethylene-vinyl acetate (EVA), and/or polyethylene terephthalate (PET). However, the thermoplastic interlayer may also contain, for example, polyurethane (PU), polypropylene (PP), polyacrylate, polyethylene (PE), polycarbonate (PC), polymethyl methacrylate, polyvinyl chloride, polyacetate resin, casting resins, acrylates, fluorinated ethylene propylene, polyvinyl fluoride and/or ethylene-tetrafluoroethylene, or copolymers or mixtures thereof. The thermoplastic interlayer may be formed from one or more superimposed thermoplastic films, the thickness of a thermoplastic film not exceeding, preferably, 1.0 mm, in particular 0.25 mm or 0.5 mm to 1.0 mm or 0.9 mm, typically around 0.4 mm or 0.7 mm.

The glazing can form a windshield or a vehicle side window. The vehicle can be a road vehicle, such as a car, truck, bus, streetcar or rail vehicle. The glazing may be fixed (non-movable in the vehicle's frame of reference). The glazing is preferably positioned vertically or essentially vertically in the vehicle frame of reference.

In the context of the present document, the idea of "centripetal" and that of "centrifugal" is to be considered with respect to the central longitudinal axis of forward travel of the vehicle equipped with the glazing according to the invention used as a windshield, that is to say the axis generally referred to as the "X-X' axis" of the vehicle, which is perpendicular to the plane of the sheet in FIG. 1; the centrifugal direction is perpendicular to this axis and in the direction of this axis whereas the centripetal direction is perpendicular to this axis and in the opposite direction, extending away from this axis.

In the exemplary embodiment shown, the glazing unit 1 includes a glazed element 2 that is curved (that is, not flat) and laminated. However, for more simplicity, it is considered in the figures that the glazed element 2 is flat.

The glazed element 2 has an outer face 20 oriented toward the exterior space E, an internal face 22 oriented toward the interior space I, and an edge face 21 situated between these two faces.

The glazed element 2 has a low longitudinal edge 23, a left lateral edge 24, a high longitudinal edge 25 and a right lateral edge 26.

The glazed element 2 has two lower corners 27, 27', located:

- for the corner 27 between the lower longitudinal edge 23 and the side edge 24, and visible in FIG. 2, of the interior space I,
- and for the corner 27' between the lower longitudinal edge 23 and the side edge 26.

The glazing 1 comprises several different profiled seals 6, 8, detailed below.

The glazed element 2 is a laminated glazed element which comprises, as can be seen in the vertical cross-section A-A' of FIG. 3 and the horizontal cross-section B-B' of FIG. 4, an exterior glass sheet 3, an interior glass sheet 5 and a plastic interlayer sheet 4 located between said two glass sheets.

However, it is possible for at least one other sheet to be interposed between the exterior glass sheet 3 and the plastic interlayer sheet 4 or between the plastic interlayer sheet 4 and the interior glass sheet 5.

The exterior glass sheet 3 has an external face 30 that is oriented toward the exterior E, an interlayer face 32 that is oriented toward the plastic interlayer sheet 4, and an edge face 31 that is located between these two faces.

The interior glass sheet 5 has an interlayer face 50 that is oriented toward the plastic interlayer sheet 4, an interior face 52 that is oriented toward the interior I and an edge face 51 that is located between these two faces.

The plastic interlayer sheet 4 has an exterior interlayer face 40 oriented toward the interlayer face 32 and which is here in contact with that interlayer face 32, an interior interlayer face 42 which is oriented toward the interlayer face 50 and which is here in contact with that interlayer face 50, as well as an edge face 41 which is situated between these two interlayer faces 32, 42.

The glazed element 2 thus has an exterior face 20 produced by the exterior face 30 of the exterior glass sheet 3, an interior face 22 produced by the interior face 52 of the interior glass sheet 5 and an edge face 21 situated between these two faces, corresponding to the edge face 31 of the exterior glass sheet 3, to the edge face 41 of the plastic sheet 4 and to the edge face 51 of the interior glass sheet 5, these three edge faces here being in line with one another.

In addition to the glazed element 2, the glazing 1 comprises, along at least part of the bottom longitudinal edge, and preferably along the entire bottom longitudinal edge, a longitudinal profiled seal 6 which is visible in detail in FIG. 3, having a longitudinal flange 60 and a longitudinal groove 61 for snap-fitting a cover part 7 external to said longitudinal profiled seal 3 (herein on the longitudinal profiled seal 3 in an external-internal direction).

In addition to the glazed element 2 and the longitudinal profiled seal 6, the glazing 1 comprises, along at least part of a lateral edge, and preferably along this entire lateral edge, a lateral profiled seal 8, visible in detail in FIG. 4, having a lateral base 80 and a lateral bead 81 for sealing between a bodywork side pillar (not shown) and the lateral edge (here the lateral edge 24) of the glazed element. The lateral bead 81 can also be used for acoustic insulation.

As can be seen in FIG. 2, up to now, in the vicinity of a corner 27, here the lower left corner with a radius of curvature R1 of, for example, 50 mm, the longitudinal profiled seal 6 and the lateral profiled seal 8 are present without touching; a distance of at least 1 centimeter, and often several centimeters, is provided between an end 62, here left, of the longitudinal profiled seal 6 and an end 82, here bottom, of the lateral profiled seal 8. The lateral profiled seal 8 is described in more detail below.

The flange 60 is attached to the internal face 22 along the bottom longitudinal edge 23, and the groove 61 extends from the flange 60 further than the edge face 21, in the centrifugal direction.

The flange 60 is located further toward the interior space than the internal face 22 of the glazed element.

The flange 60 is integral with groove 61; it is located proximate to the groove bottom, outside the groove, and extends in a centripetal direction.

Viewed in cross-section, an adhesive band 69 located on the flange 60 bonds the inner flange 60, and thus the longitudinal profiled seal 6, to the internal face 22 of the glazed element.

As can be seen in FIG. 2, until now, both ends of the longitudinal profiled seal were each with a straight edge, that is, with an edge cut perpendicular to the longitudinal direction of the longitudinal profiled seal. Sometimes, this longitudinal profiled seal was curved after these straight cuts at its ends; despite this, the ends of the longitudinal profiled seal were considered to be straight.

Viewed in cross-section, the cover part 7 features a barbed hook 70 which penetrates the groove 60 during snap-fitting.

The groove 60 has a mouth and a bottom: during snap-fitting of the cover part 7, the barbed hook 70 penetrates into the groove 60 through the mouth and in the direction of the bottom; in the snap-fitted position, the barbed hook 70 generally does not touch the bottom of the groove.

The mouth of the groove, via which the barbed hook 70 is introduced, is made by two throats: a centrifugal throat 67, situated to the left of the barbed hook 70 in FIG. 3, and a centripetal throat 68, situated to the right of the barbed hook 70 in these same figures. These two throats are there to guide the barbed hook 70 with precision toward the bottom of the groove 60 during the snap-fitting of the barbed hook 70.

The cover part 7 is intended to be positioned further toward the exterior than the profiled joint 6 and to cover it at least in part when the glazing 1 is viewed from the exterior E.

The groove 60 extends along the lower edge of the glazed element, more centrifugal than the edge face 21 of the glazed element 2, that is, below the edge face 21 when the glazing is considered vertical, as in FIG. 1.

The mouth of the groove is oriented toward the exterior space E.

The bottom of the groove 60 may be situated further toward the interior than the internal face 22 of the glazed element; that does not impair the positioning of the glazing in the bodywork opening because there is space under the internal face 22.

The two throats of the mouth of the groove are each hammer-shaped, with the heads almost facing one another, the centrifugal throat 67 being located slightly further out than the centripetal throat 68.

The barbed hook is a double hook: it is made up, when viewed in cross section, of two bosses facing away from one another and offset, the centrifugal boss intended to sit under the centrifugal throat 67 being situated slightly further toward the exterior than the centripetal boss that is intended to sit under the centripetal throat 68.

The snap-fitting thus consists in the barbed hook 70 entering the groove 60 and, more specifically, in the two bosses of the barbed hook entering the groove 60 under the two throats.

For correct retention, the width of the mouth, at the shortest distance between the two throats, is less than the width of the two bosses at their widest.

It is important to note that this snap-fitting of the barbed hook 70 of the cover part 7 into the groove 60 of the longitudinal profiled seal 6 is carried out well after the longitudinal profiled seal 6 has been attached to the glazed element 2; in fact, the glazing 1 is delivered to the car manufacturer or car repairer with the longitudinal profiled seal 6 attached to the glazed element and it is only after the glazing 1 has been adhered into the bodywork opening that the barbed hook 70 is snap-fitted into the groove 60.

The material of which the groove 60 is made may be reinforced by the presence, on the inside, of a tenon 66, such as a metallic insert for example, which makes it possible to increase the rigidity of the groove. This tenon may for example be an aluminum profiled section with a thickness of 0.4 mm. It increases the rigidity of the groove 60.

When viewed in cross section, the external face 20 of the glazed element 2 is preferably free with respect to said groove 61.

The profiled joint 6 is prefabricated before its attachment to the glazed element: it is fabricated by extrusion through an extrusion die, and then is curved along its length to conform to the overall shape of the lower part of the glazed element along its length, then is attached to the glazed element.

To attach the profiled seal 6 to the glazed element 2, it is recommended to:

position the groove 61 against edge face 21, then adhere the profiled seal to the glazed element 2.

This adhesion may be performed using the adhesive band 69 formed by a layer of adhesive or an adhesive tape, in particular a double-sided adhesive tape, which is situated on the external face of the interior flange 60.

For good adhesion, it is preferable to provide a longitudinal strip of primer 65, between the flange 60 and the internal face 22. This longitudinal strip of primer 65 follows the size and shape of the adhesive band 69; the longitudinal strip of primer 65 is at least as wide as the adhesive band 69.

The longitudinal strip of primer 65 is applied against the internal face 22 before the longitudinal profiled seal 6 is attached to the internal face 22, to ensure good adhesion of the flange 60 to the internal face 22.

The flange 60 has a width $l_{60}$, comprised between 5.0 and 20.0 mm, or even comprised between 8.0 and 15.0 mm, in particular of 12 mm. This width is enough to ensure that the interior flange is held firmly against the interior glass sheet.

In the embodiment shown in FIG. 3, the cover part 7 is intended to be positioned further toward the exterior than the profiled seal 6 and to cover it only in part when the glazing 1 is viewed from the exterior E; the centrifugal throat 68 constitutes a lip the external face of which is both in line with (flush with) the external face 20 of the glazed element and in line with (flush with) the external face of the cover part 7.

The glazed element 2 is fabricated before the profiled joint 6 is attached to the glazed element 2 and before the lateral profiled joint 8 is attached to the glazed element 2, that is to say the glass sheets 3, 5 are laminated together with the plastic sheet in order to form a laminated glazing before the profiled joint 6 is attached to the glazed element 2.

The lateral profiled seal 8 is arranged on only part of the periphery of the glazing 1: it is present at least in the bottom of the left and right lateral edges 24, 26, respectively, of the glazed element and preferably along the whole of these left and right lateral edges; it is further preferably along the whole of the top longitudinal edge 25.

The constituent material of the lateral profiled joint 8 may be a polymer material such as a thermoplastic (PVC, TPE, etc.), a polyurethane or even a synthetic rubber such as EPDM or any other suitable flexible plastic material.

The lateral profiled seal 8 is preferably produced using a manufacturing method known as “extrusion”, as it involves a step of laying the lateral profiled seal 8 in situ, already in its profiled shape, directly against the internal face 22. It can be prefabricated before being attached to the glazed element: in this case, it is manufactured by extrusion through an extrusion die, then attached to the glazed element.

As with the longitudinal profiled seal 6, for good adhesion, it is preferable to provide a lateral strip of primer 88, between the base 80 and the internal face 22. This lateral strip of primer 88 follows the size and shape of the base 80; the lateral strip of primer 88 is at least as wide as the base 80.

The lateral strip of primer 88 is applied against the internal face 22 before the lateral profiled seal 8 is attached to the internal face 22, to ensure good adhesion of the base 80 to the internal face 22.

The lateral primer strip 88 herein has a different composition from the longitudinal primer strip 65.

In this case, the bead 81 has a lip 87 which extends along the lateral profiled seal 8. Before the glazing is attached in the bodywork opening, the lip 87 extends substantially from the edge face 21 in the centrifugal direction after the base 80. When the glazing is attached in the bodywork opening, the lip 87 deforms (here upward), to come into contact with the opening.

FIG. 5 shows a solution wherein the longitudinal profiled seal 6 extends into the environment of the corner 27 with, in the environment of this corner 27:

- one end 89 of the lateral profiled seal extends into the environment of the corner 27 with the base 80 thus located opposite the flange 60 of the longitudinal profiled seal 6, and even extending opposite the groove 61 up to the corner between the end 62 of the longitudinal seal 6 and the centrifugal edge of the longitudinal groove 61, and
- the flange 60 and groove 61 do not extend into the environment of the corner 27.

The end 89 (here the bottom end) is thus in contact, or almost in contact (with a maximum gap of 2 mm, or even 3 mm), with the end 62 (here the left end) of the longitudinal profiled seal 6.

Thus, the longitudinal profiled seal 6 is located vertically above the lateral profiled seal 8.

In FIG. 5, the end 89 has a pointed bevel, with the tip of the bevel pointing toward the corner between the end 62 of the longitudinal seal 6 and the centrifugal edge of the longitudinal groove 61.

The groove 61 has a pointed bevel at the end 62, preferably with a slot 63 between the flange 60 and the base 80.

Only the end (edge) of the groove 61 is beveled; the end (edge) of the flange 60 is straight, that is, perpendicular to the general longitudinal direction of the longitudinal profiled seal 6 (or at least perpendicular to the general longitudinal direction of the longitudinal profiled seal 6 before any curvature at the ends). In this way, the gap between the longitudinal and lateral profiled seals is minimized, and the surface area of the flange facing the internal face 22 is maximized.

Since the bead 81 is intended to be compressed against a bodywork pillar, it may be preferable for the end 62 to stop approximately 2 mm before the end 89 of the lateral profiled seal 8 so as not to be compressed itself when the glazing is installed in the bodywork opening.

A slot 63 may be present between the part of the flange 60 (here to the right of the slot 63) that is attached to the internal face 22 and the base 80 (here to the left of the slot 63).

This slot 63 can further facilitate the removal of the adhesive band 69 in the portion of the end 62 to prevent this part of the flange from adhering to the internal face 22; it can also facilitate the application and removal (here to the left of the slot) of a tool designed to press indirectly (here to the right of the slot), for example by a roller-pressing operation, the flange 60 against the internal face 22 when bonding the longitudinal profiled seal 6 in its part other than the end 62.

Preferably, the two ends 62 of the longitudinal profiled seal are identical; preferably they both have a pointed bevel, facing upwards; preferably for these two ends, only the grooves have beveled edges at the ends: the flanges have straight edges at the ends. For the glazing 1, there are two slots 63, one at each end of the longitudinal profiled seal.

In the context of the invention, the lateral profiled seal 8 is preferably present along the entire perimeter of the glazed element 2, except in the part of this perimeter where the longitudinal profiled seal 6 is present.

Preferably, in the context of the invention:

- the longitudinal profiled seal 6 is attached first to the internal face 22, preferably after applying the lateral primer strip 68, then
- the lateral profiled seal 8 is attached second to the internal face 22, preferably after applying the lateral primer strip 88
- with the end 89 of the lateral profiled seal 8 extending into the environment of the corner 27, so that the base 80 is located opposite the flange 60 of the longitudinal profiled seal 6, or so that this base 80 even extends further down, opposite the groove 61 of the longitudinal profiled seal 6.

In this way, the end 89 provides a precise and reliable reference point for the subsequent attachment of the longitudinal profile 6, enabling the two profiles to be attached very quickly and precisely. It is easy to repeat from one glazing to the next.

Before the longitudinal profiled seal 6 is attached to the internal face 22, the end 62 can be adjusted and in particular the two opposite ends of the longitudinal profiled seal 6 can be adjusted so that the longitudinal profiled seal 6 is well centered laterally.

The invention claimed is:

1. A glazing comprising a glazed element having an external face, an internal face and an edge face located between the external and internal faces, a longitudinal edge, a lateral edge and a corner located between said longitudinal edge and said lateral edge, said glazing comprising several different profiled seals including:

- a longitudinal profiled seal having a longitudinal flange and a longitudinal groove for snap-fitting an outer cover part to said longitudinal profiled seal, said longitudinal flange being attached to said internal face along said longitudinal edge and said groove extending from said longitudinal flange further than said edge face,
- a lateral profiled seal having a base and a bead, said base being attached to said internal face along said lateral edge and said bead extending from said base further than said edge face,
- wherein one end of said lateral profiled seal extends into an environment of said corner with said base located opposite said longitudinal flange of the longitudinal profiled seal, or even opposite said groove of the longitudinal profiled seal.

2. The glazing according to claim 1, wherein said end of said longitudinal profiled seal has a pointed bevel or an obtuse bevel.

3. The glazing according to claim 1, wherein a lateral strip of primer is located between said base and said internal face, said lateral strip of primer extending into the environment of said corner.

4. The glazing according to claim 1 wherein a longitudinal strip of primer is located between said longitudinal flange and said internal face, said longitudinal strip of primer not extending into the environment of said corner.

5. The glazing according to claim 4, wherein said longitudinal primer strip has a different composition from that of a lateral primer strip located between said base and said internal face.

6. The glazing according to claim 1, wherein said groove has a pointed or obtuse bevel at least at one end of said longitudinal profiled seal.

7. The glazing according to claim 1, wherein said groove has a pointed bevel or an obtuse bevel at least at one end of said longitudinal profiled seal.

8. The glazing according to claim 7, wherein said flange has a straight edge at least at one end.

9. The glazing according to claim 6, wherein said groove has a pointed or obtuse bevel at least at two ends of said longitudinal profiled seal.

10. The glazing according to claim 6, wherein one slot is between said flange and said base.

11. The glazing according to claim 10, wherein two slots between said flange and said base.

12. The glazing according to claim 7, wherein said groove has a pointed bevel or an obtuse bevel at least at both ends of said longitudinal profiled seal.

13. The glazing according to claim 8, wherein said flange has a straight edge at least at both ends.

14. A method for manufacturing a glazing, having an external face, an internal face and an edge face located between the external and internal faces, a longitudinal edge, a lateral edge and a corner located between said longitudinal edge and said lateral edge, said glazing comprising several different profiled seals including:

a longitudinal profiled seal having a longitudinal flange and a longitudinal groove for snap-fitting a cover part to said longitudinal profiled seal, said longitudinal flange being attached to said internal face along said longitudinal edge and said groove extending from said base further than said edge face, a lateral profiled seal having a base and a lateral bead, said base being attached to said internal face along said lateral edge and said bead extending from said base further than said edge face, wherein said longitudinal profiled seal is attached to said internal face, then said lateral profiled seal is attached to said internal face, and said end of the lateral profiled seal extends into an environment of said corner with said base which is located opposite said flange of the longitudinal profiled seal, or opposite said groove of the longitudinal profiled seal.

15. The method according to claim 14, wherein, before said longitudinal profiled seal is attached to said internal face, a longitudinal primer strip is applied against said internal face, said longitudinal primer strip not extending into the environment of said corner.

16. The method according to claim 14, wherein, before said lateral profiled seal is attached to said internal face, a lateral primer strip is applied against said internal face, said lateral primer strip extending into the environment of said corner.

17. The method according to claim 14, wherein a step of adjusting an end of the longitudinal profiled seal is performed before said longitudinal profiled seal is attached to said internal face.

* * * * *